(12) United States Patent
Deleon

(10) Patent No.: US 7,710,250 B2
(45) Date of Patent: May 4, 2010

(54) SYSTEM AND METHOD FOR VERIFYING FUEL CAP ENGAGEMENT

(75) Inventor: Marcos J. Deleon, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 11/746,050

(22) Filed: May 8, 2007

(65) Prior Publication Data

US 2008/0278300 A1    Nov. 13, 2008

(51) Int. Cl.
- B60Q 1/00 (2006.01)
- G01D 13/00 (2006.01)
- G08B 21/00 (2006.01)
- G01M 3/04 (2006.01)

(52) U.S. Cl. ............... 340/438; 116/201; 340/451; 340/605; 340/606; 340/611; 73/40; 702/51

(58) Field of Classification Search ............ 340/438, 340/439–462, 605, 606–611, 614; 702/51; 73/40, 40.7, 40.1, 40.2, 46, 49.7; 220/746, 220/86.2; 123/516–519; 116/201
See application file for complete search history.

(56) References Cited

U.S. PATENT DOCUMENTS

| | | | |
|---|---|---|---|
| 4,583,072 A | 4/1986 | Matsushita | |
| 4,770,677 A | 9/1988 | Harris | |
| 5,275,144 A | 1/1994 | Gross | |
| 5,451,927 A | 9/1995 | Thompson | |
| 5,465,614 A | 11/1995 | Fournier | |
| 5,467,641 A * | 11/1995 | Williams et al. | 73/49.7 |
| 5,507,176 A | 4/1996 | Kammeraad et al. | |
| 5,560,243 A | 10/1996 | Wild | |
| 5,675,073 A | 10/1997 | Otsuka | |
| 5,750,888 A * | 5/1998 | Matsumoto et al. | 73/114.39 |
| 5,763,764 A | 6/1998 | Mieczkowski et al. | |
| 5,898,108 A | 4/1999 | Mieczkowski et al. | |
| 5,944,076 A | 8/1999 | Palvoelgyi | |
| 6,044,314 A | 3/2000 | Cook et al. | |
| 6,158,270 A | 12/2000 | Garman et al. | |
| 6,202,478 B1 | 3/2001 | Blomquist et al. | |
| 6,206,219 B1 | 3/2001 | Bruggenolte | |
| 6,257,050 B1 * | 7/2001 | Nagano et al. | 73/47 |
| 6,285,934 B1 | 9/2001 | Shaw | |
| 6,363,921 B1 * | 4/2002 | Cook et al. | 123/520 |

(Continued)

*Primary Examiner*—Daniel Wu
*Assistant Examiner*—Nay Tun
(74) *Attorney, Agent, or Firm*—Gregory J. Burke; Michael A. Forhan; Eley Law Firm Co.

(57) ABSTRACT

A system for verifying fuel cap engagement utilizes a transducer coupled to a purge line of a fuel vapor recovery system to generate an electrical signal corresponding to one of the vapor pressure and the vapor flow rate in the purge line. A monitor receives the electrical signal and estimates the vapor pressure when the electrical signal corresponds to the vapor flow rate. The monitor likewise estimates the vapor flow rate when the electrical signal corresponds to the vapor pressure. The monitor also correlates the electrical signal and the estimate to generate a dataset relating vapor pressures to corresponding vapor flow rates at predetermined time intervals, computes a linear approximation of pressure versus flow rate, and computes a curve approximation of pressure versus flow rate. An indicator is actuated by the monitor when the difference between the computed linear and curve approximations is less than a predetermined threshold value.

22 Claims, 6 Drawing Sheets

U.S. PATENT DOCUMENTS

| | | | |
|---|---|---|---|
| 6,371,089 B1 * | 4/2002 | Matsuoka et al. | 123/519 |
| 6,467,463 B2 * | 10/2002 | Kitamura et al. | 123/516 |
| 6,772,739 B2 | 8/2004 | Veinotte et al. | |
| 6,802,210 B2 | 10/2004 | Mitani et al. | |
| 6,880,383 B2 * | 4/2005 | McLain et al. | 73/49.2 |
| 6,990,945 B1 | 1/2006 | Kropinski et al. | |
| 7,005,975 B2 | 2/2006 | Lehner | |
| 2003/0102976 A1 | 6/2003 | Lavallee | |
| 2006/0031000 A1 | 2/2006 | Amano et al. | |
| 2009/0099795 A1 * | 4/2009 | Behar et al. | 702/51 |

* cited by examiner

SYSTEM AND METHOD FOR VERIFYING FUEL CAP ENGAGEMENT

FIELD

The present invention relates generally to fuel systems, in particular to a system and method to verify that a detachable fuel cap is properly coupled to a filler neck of the fuel system.

BACKGROUND

Vehicles that utilize an internal combustion engine as a motive power source typically include a liquid fuel reservoir or tank having a fuel cap that is detachably coupled to a filler neck of the tank. During a refueling operation the fuel cap is removed from the filler neck, thereby providing an access point for the addition of fuel to the tank. It is desirable to ensure that the fuel cap is properly engaged to the filler neck to prevent evaporative loss of fuel. Such evaporative losses reduce the fuel economy of the vehicle, are a waste of scarce fuel resources, and are a common source of air pollution.

Most liquid-fuel operated vehicles include a fuel vapor recovery system to store and dispose of vapors normally created in the fuel system, thereby preventing their escape to the atmosphere. An on-board diagnostic (OBD) system can be utilized to test and monitor the performance of the fuel vapor recovery system, including leaks and improperly installed or missing fuel caps. Typically, an engine malfunction indicator is activated when two consecutive OBD leak tests fail. A vehicle owner may then be obliged to have the vehicle serviced, inconveniencing the owner and adding to the operating expense of the vehicle.

Other systems have been devised to detect a missing fuel cap by computing a linear approximation of vapor pressure versus vapor flow rate in a vapor recovery system. In these systems the status of fuel cap engagement is determined by the slope of the resulting linear approximation. However, it can be difficult to determine whether the fuel cap is properly engaged using a linear approximation as the sole determinant due to changing engine operating conditions and data scatter.

Still other systems utilize sensors mounted proximate the filler neck to detect when a fuel cap is missing. However, such sensors often fail to detect an improperly installed fuel cap. There is a need for a reliable way to detect an improperly installed or missing fuel cap.

SUMMARY

The embodiments of the systems and methods for verifying fuel cap engagement disclosed herein take advantage of the principle that fuel vapor flow rate and pressure have a non-linear relationship that is most evident when the velocity of vapor flow is increased. With respect to a vehicle fuel system, installing the fuel cap decreases the effective diameter of the piping of the fuel system, thus increasing velocity for a given flow rate. As velocity increases for a given flow rate the relationship between vapor pressure and vapor flow rate is more accurately represented by a curve fit, such as a polynomial or exponential approximation. In contrast, a low velocity (i.e., fuel cap disengaged condition) can be accurately represented by a linear approximation. It is thus possible to determine fuel cap engagement by examining the difference between the linear and curve approximations of vapor pressure with respect to flow rate. For example, if the difference between the linear and curve approximations is small, the fuel cap can be determined to be disengaged. If the difference is large, the fuel cap can be determined to be properly engaged. The difference between linear and curve approximations may be computed at a specific flow or pressure, or alternatively may be evaluated over a plurality of pressures or flow rates, or over a range of flow rates or pressures.

An object of the present invention is a system for verifying fuel cap engagement. The system utilizes at least one transducer coupled to a purge line of a fuel vapor recovery system to generate an electrical signal corresponding to at least one of the vapor pressure and the vapor flow rate in the purge line. A monitor receives the electrical signal and estimates the vapor pressure in the purge line when the electrical signal corresponds to the vapor flow rate in the purge line. Likewise, the receiver estimates the vapor flow rate in the purge line when the electrical signal corresponds to the vapor pressure in the purge line. In the alternative, the system may employ two transducers to measure both vapor pressure and vapor flow rate. The receiver then correlates the electrical signal and the estimate to generate a dataset comprising data points relating vapor pressure to a corresponding vapor flow rate at predetermined time intervals. The receiver utilizes the dataset to compute a linear approximation of pressure versus flow rate, and to compute a curve approximation of pressure versus flow rate. An indicator coupled to the monitor is actuated by the monitor when the difference between the computed linear and curve approximations is less than a predetermined threshold value.

Another object of the present invention is a method for verifying fuel cap engagement. The method includes the step of measuring one of the pressure and the flow rate of fuel vapor in a purge line of a fuel vapor recovery system. The flow rate of fuel vapor in the purge line is estimated when the vapor pressure is measured. Likewise, the pressure of fuel vapor in the purge line is estimated when the vapor flow rate is measured. The pressure and flow rate measurements and estimates are then correlated at predetermined time intervals. A linear approximation of pressure versus flow rate in the purge line is computed. A curve approximation of pressure versus flow rate in the purge line is also computed. The difference between the linear and curve approximations is then computed, and an indicator is actuated if the computed difference is less than a predetermined threshold value.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
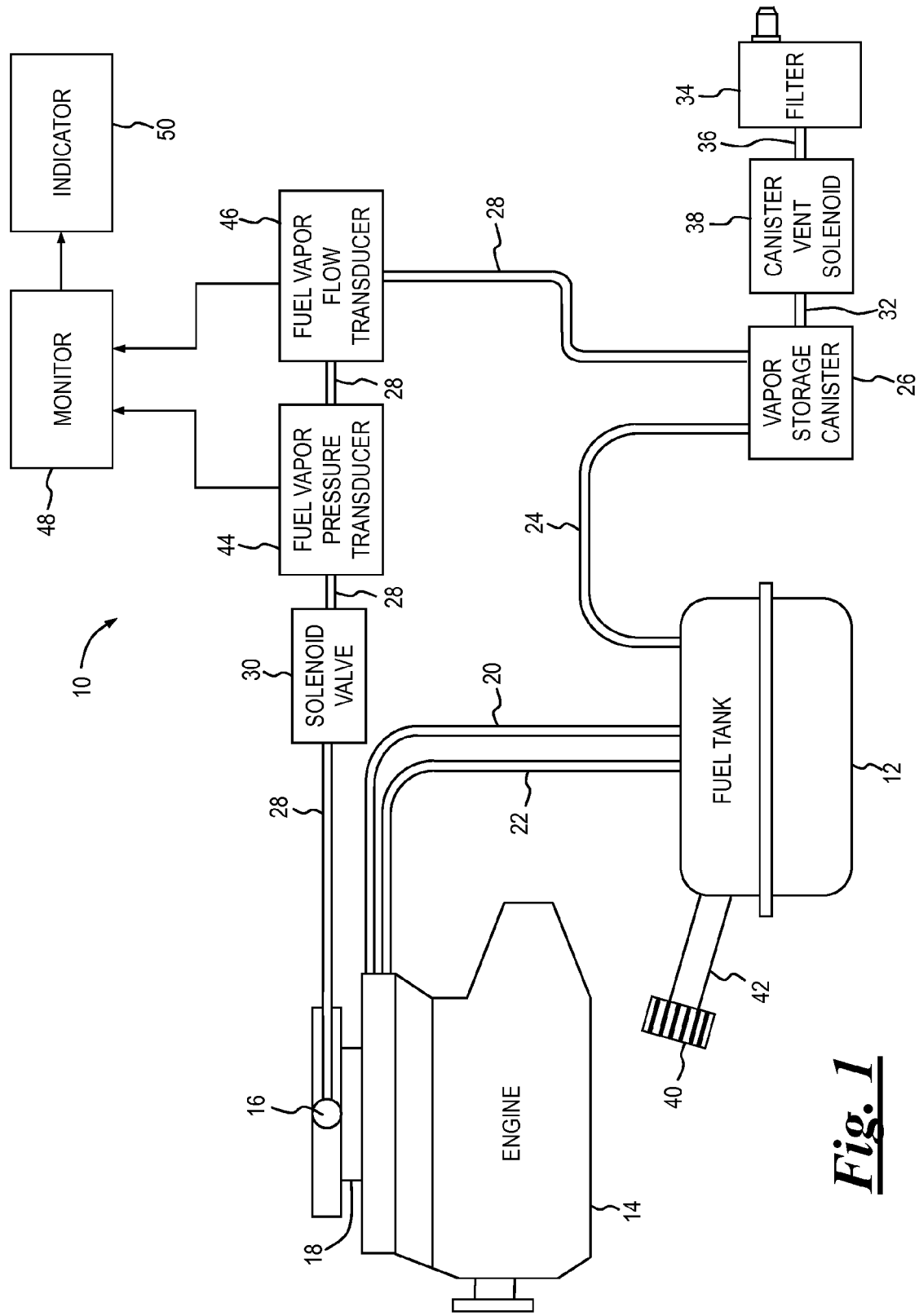
FIG. 1 is a schematic diagram of a fuel vapor recovery system for use with an internal combustion engine.

Referring now to the drawings, FIG. 1 schematically depicts a typical fuel vapor recovery system 10 used in a vehicle. Vehicle fuel systems typically include a fuel tank 12 that stores fuel for use with an engine 14. A throttle valve 16 adjacent an intake passage 18 controls the amount of intake air supplied to engine 14. Fuel is supplied to engine 14 from fuel tank 12 through a fuel supply line 20 and unused fuel is returned to the fuel tank through a fuel return line 22. It should be appreciated by those skilled in the art that a fuel system having no fuel return line 22 may also be used.

During operation of engine 14 at elevated temperature and during refueling of fuel tank 12, fuel vapors are typically formed in the fuel tank. Vapor recovery system 10 includes a fuel vapor vent line 24 to vent fuel vapor from the fuel tank 12. Thus, when fuel enters fuel tank 12 during a refueling operation, any fuel vapor exiting the fuel tank is directed through fuel vapor vent line 24 to a vapor storage canister 26. Vapor storage canister 26 is filled with an absorbent material, typically activated charcoal that absorbs the fuel vapor.

The fuel vapors are periodically purged to refresh vapor storage canister 26. During the purging process, fuel vapor stored in vapor storage canister 26 is drawn through a purge line 28 into the intake passage 18. When engine 14 is operating, intake passage 18 operates at a negative pressure, causing the fuel vapors stored in vapor storage canister 26 to be drawn into intake passage 18. Flow from vapor storage canister 26 to intake passage 18 is typically controlled by a solenoid valve 30. Solenoid valve 30 is positioned in purge line 28, and is connected to and receives an operating signal from an engine control unit (not shown). In this way, the engine control unit operates to control the amount of fuel and air supplied to engine 14 to achieve the proper stoichiometric ratio for efficient combustion.

In order to purge vapor storage canister 26, fresh air is drawn into the vapor storage canister through a fresh air inlet 32 located on the canister. Typically, a filter 34 is placed on or adjacent fresh air inlet 32 and is used to filter the fresh air to remove any dirt, dust and water prior to the air being introduced into vapor storage canister 26. Depending upon the location of vapor storage canister 26 and filter 34 on the vehicle, a fresh air line 36 may be used to transport the clean or filtered air to the vapor storage canister 26. It is evident that while filter 34 is shown separated from vapor storage canister 26, the filter may optionally be placed adjacent, connected to, or formed internal with the vapor storage canister, thus eliminating the need for a fresh air line 36. Some systems place the vapor storage canister 26 adjacent, connected to or internal with fuel tank 12.

In many instances, a canister vent solenoid 38 is used to close the fresh air line 36 during a system leak check. Typically, filter 34 is used with canister vent solenoid 38. However, such use is not always necessary. Additionally, canister vent solenoid 38 can be incorporated into filter 34, typically when the filter is formed as part of vapor storage canister 26.

Fuel tank 12 typically includes a fuel cap 40 that is detachably coupled to a filler neck 42. During a refueling operation fuel cap 42 is removed from filler neck 42, thereby providing external access to fuel tank 12 for the addition of fuel to the tank. In order for fuel vapor recovery system 10 to function properly it is essential that fuel cap 40 be properly engaged to filler neck 42 when the vehicle is not being refueled. It is also desirable to ensure that fuel cap 40 is properly engaged to filler neck 42 to prevent evaporative loss of fuel.

With continued reference to FIG. 1, fuel vapor recovery system 10 may further include a fuel vapor pressure transducer 44 and a fuel vapor flow rate transducer 46, both transducers being connected to and in series with purge line 28. Electrical signals generated by transducers 44, 46 are coupled to a monitor 48, which receives the signals and actuates an indicator 50 under certain transducer signal conditions, discussed more fully below.

Fuel vapor pressure transducer 44 may be any type of conventional transducer now known or hereafter invented that is configured to convert a sensed pressure into a corresponding analog or digital electrical output signal. Types of output signals include, without limitation, variable resistance, capacitance, inductance, voltage, current and digital data signals. Types of pressure transducers include, without limitation, one or more variable-resistance, variable capacitance, variable inductance and strain-gage transducer elements. The pressure transducer may comprise a plurality of transducer elements arranged in a conventional Wheatstone bridge configuration to generate an output electrical signal having high accuracy.

Fuel vapor flow rate transducer 46 may be any type of conventional transducer now known or hereafter invented that is configured to convert a sensed rate of vapor flow into a corresponding analog or digital electrical output signal. Types of output signals include, without limitation, variable resistance, capacitance, inductance, voltage, current and digital data signals. The flow rate transducer may comprise a plurality of transducer elements arranged in a conventional Wheatstone bridge configuration to generate an output electrical signal having high accuracy. Types of flow rate transducers include, without limitation, mechanical, venturi, orifice-plate, pitot tube, vortex, magnetic, ultrasound and coriolis flow meters.

Monitor 48 receives electrical signals from pressure transducer 44 and flow transducer 46, and actuates indicator 50 if predetermined criteria are met. Monitor 48 may be configured using conventional analog or digital electronic circuitry or a combination thereof, and may optionally utilize conventional memory devices such as magnetic, electronic and optical memory storage devices containing a predetermined set of instructions, such as a computer program.

Indicator 50 may be any combination of visual and aural annunciators configured to attract the attention of the operator of the vehicle and signal that fuel cap 40 is loose or missing. Example indicators include warning lights, visual displays, speakers, piezoelectric sounders and chimes. Indicator 50 may be a standalone device, or may be incorporated as a constituent element of a multi-function vehicle system including, without limitation, an on-board diagnostic system, computer, fuel control system and emissions control system.

Figure 2:
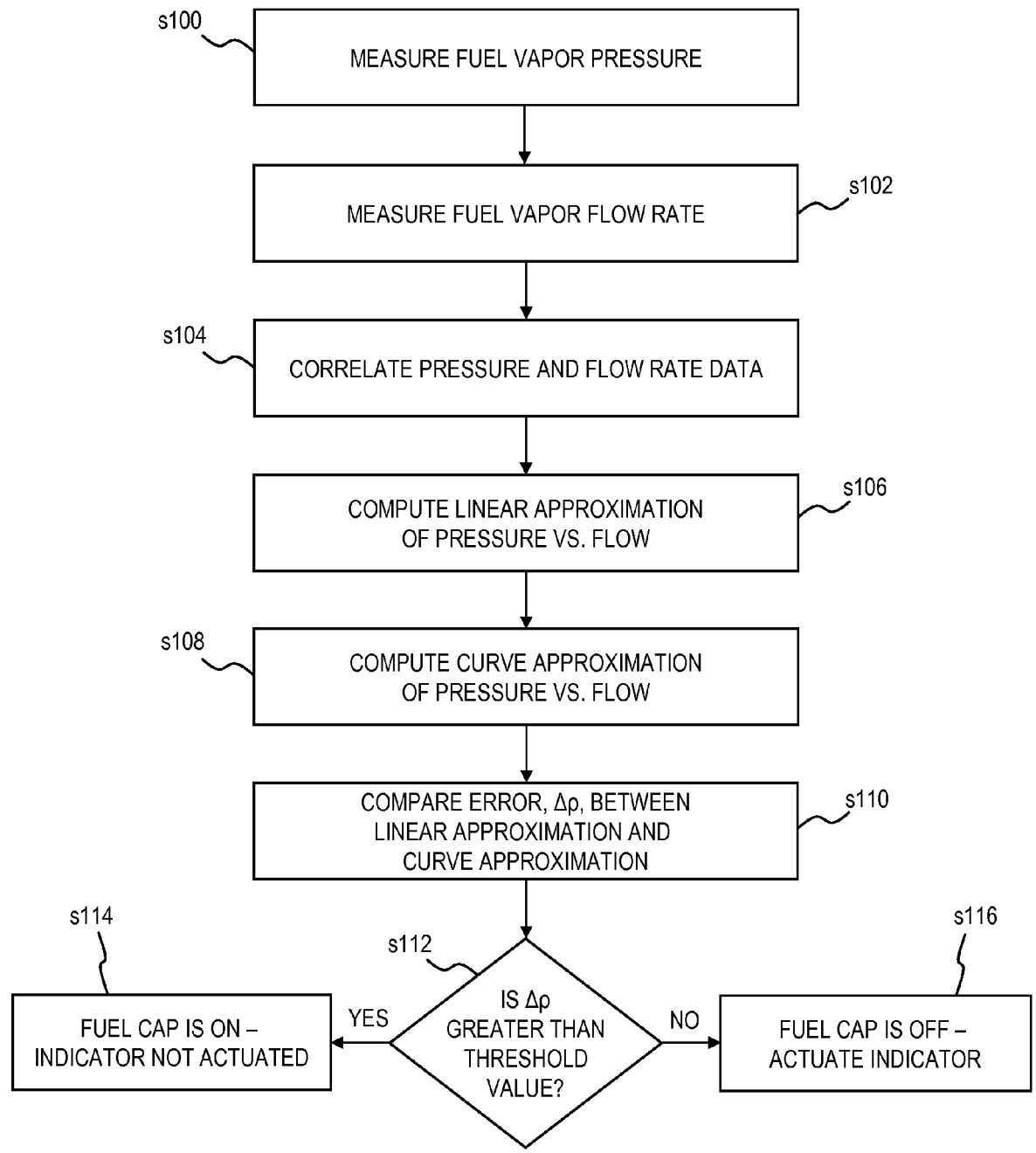
FIG. 2 is a flow diagram of a method for verifying fuel cap engagement according to an embodiment of the present invention.

With reference to FIGS. 1 and 2 in combination, a flow diagram detailing a method for verifying fuel cap engagement is shown in FIG. 2. At step s100 pressure transducer 44 is utilized to measure the fuel vapor pressure in purge line 28 at one or more predetermined time intervals. The pressure measurements are provided to monitor 48, which correlates the measurements with the time intervals.

At step s102 flow transducer 46 is utilized to measure the fuel vapor flow rate in purge line 28 at time intervals corresponding to those utilized for step s100. The flow rate data are provided to monitor 48, which correlates the measurements with the time intervals.

At step s104 monitor 48 correlates the measured fuel vapor pressure, Q, to the measured fuel vapor flow rate, $\rho$, for each predetermined time interval, t, to obtain a plurality of data points (ρ, Q)t. The result is a dataset comprising data points relating vapor pressure to a corresponding vapor flow rate at predetermined time intervals.

At step s106 monitor 48 utilizes the dataset obtained in step s104 to compute a first approximation of vapor pressure versus vapor flow rate, utilizing conventional linear regression statistical analysis to derive a straight-line equation to express the relationship between ρ and Q in the dataset, in the form of Equation 1:

$$\rho = mQ + b \qquad \text{Equation 1}$$

where m is the slope of the line, b is the y-intercept of the line, Q is the vapor flow rate and ρ is vapor pressure.

At step s108 monitor 48 utilizes the dataset of step s104 to compute a second approximation of vapor pressure versus flow rate, utilizing conventional curve fitting regression analysis to derive an equation having one or more of polynomial, exponential and logarithmic terms to express the relationship between ρ and Q in the dataset.

At step s110 monitor 48 compares the first and second approximations of pressure versus flow computed in steps s106, s108, respectively. The difference between ρ at predetermined flow rates Q for the first and second approximations, labeled Δρ herein for convenience, is computed.

Figure 3:
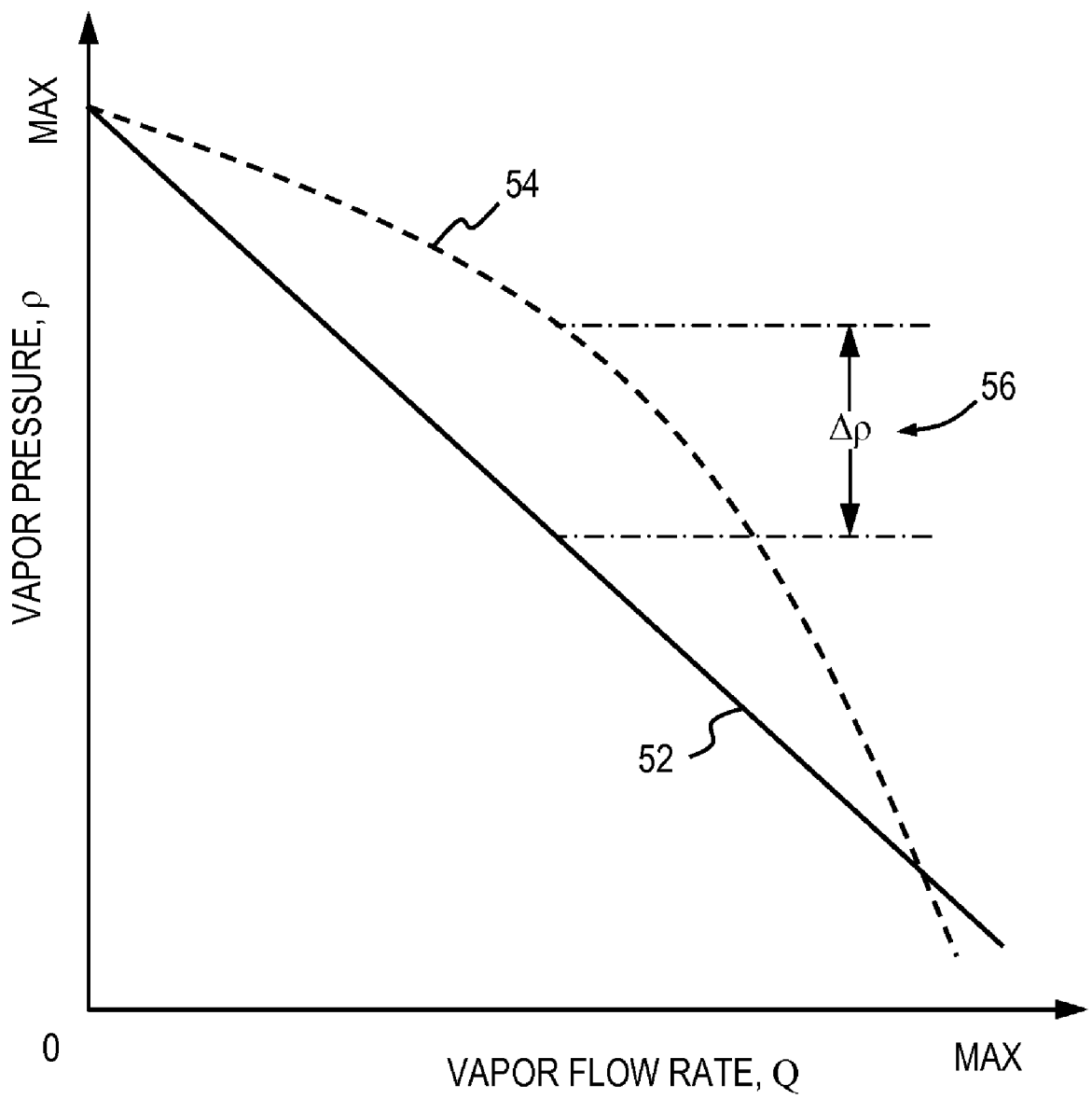
FIG. 3 is a first graph comparing the difference between a linear approximation and a curve approximation of vapor pressure versus vapor flow rate according to an embodiment of the present invention.
Figure 4:
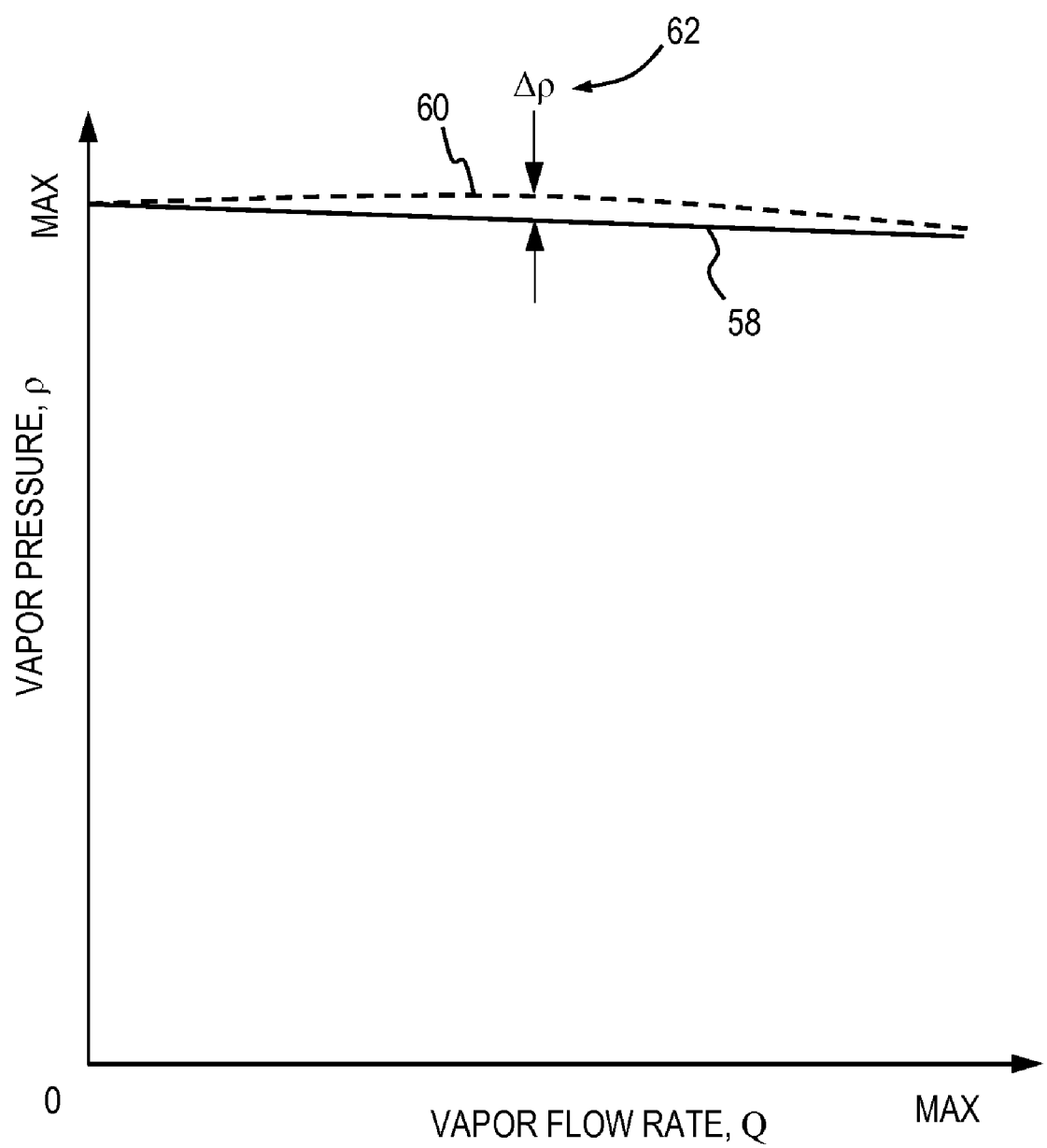
FIG. 4 is a second graph comparing the difference between a linear approximation and a curve approximation of vapor pressure versus vapor flow rate according to an embodiment of the present invention.

At step s112 the magnitude of the difference, Δρ, is compared to a predetermined threshold value. If Δρ exceeds the threshold value, fuel cap 40 is deemed to be properly engaged to filler neck 42, as at step s114, and indicator 50 is not actuated. A graph of a first straight-line approximation 52 and a first curve approximation 54 with a resultant relatively large Δρ 56, indicative of a properly engaged fuel cap 40, is shown in FIG. 3 for general reference. If Δρ is less than the threshold value, fuel cap 40 is deemed to be loose or missing, as at step s116, and indicator 50 is actuated. A graph showing a second straight-line approximation 58 and a second curve approximation 60 with a resultant relatively small Δρ 62, indicative of a loose or missing fuel cap 40, is shown in FIG. 4 for general reference.

With respect to step s110, it should be noted that Δρ can be computed in a number of ways. In one embodiment of the present invention Δρ is computed at a predetermined vapor flow rate or a predetermined vapor pressure. In other embodiments Δρ is computed at a plurality of predetermined vapor flow rates and/or vapor pressures over a predetermined range of flow rates and/or pressures. Furthermore, any or all of data points (ρ, Q), the straight-line approximation, curve approximation and Δρ may be computed using running averages.

Figure 5:
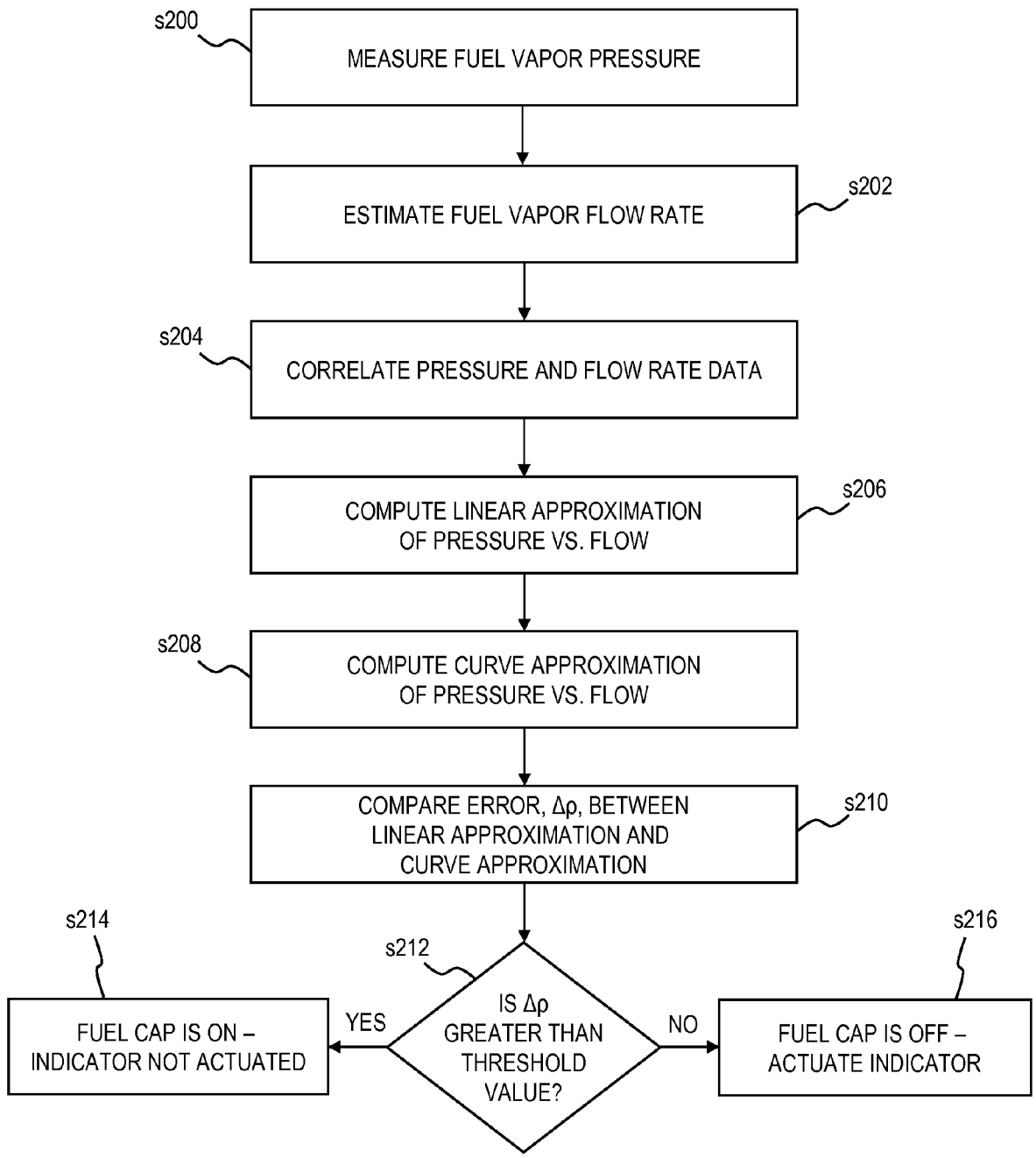
FIG. 5 is a flow diagram of a method for verifying fuel cap engagement according to another embodiment of the present invention.

With reference to FIGS. 1 and 5 in combination, a flow diagram detailing a method for verifying fuel cap engagement using a single transducer is shown in FIG. 5 according to another embodiment of the present invention. At step s200 fuel vapor pressure transducer 44 is utilized to measure the fuel vapor pressure in purge line 28 at one or more predetermined time intervals. Pressure measurements are provided to monitor 48, which correlates the measurements with the time intervals. At step s202 the fuel vapor flow rate in purge line 28 is estimated by monitor 48, using the fuel vapor pressure measurements of step s200 and conventional fluid dynamics principles. Such methods for estimating fuel vapor flow rate are well-known by those skilled in the art of fluid dynamics and thus will not be detailed further here. At step s204 monitor 48 correlates the estimates of step s202 with the vapor pressure measurements and time intervals of step s200. Steps s206 through s216 correspond to previously-discussed steps s106 through s116 respectively and thus will not be reiterated here.

Figure 6:
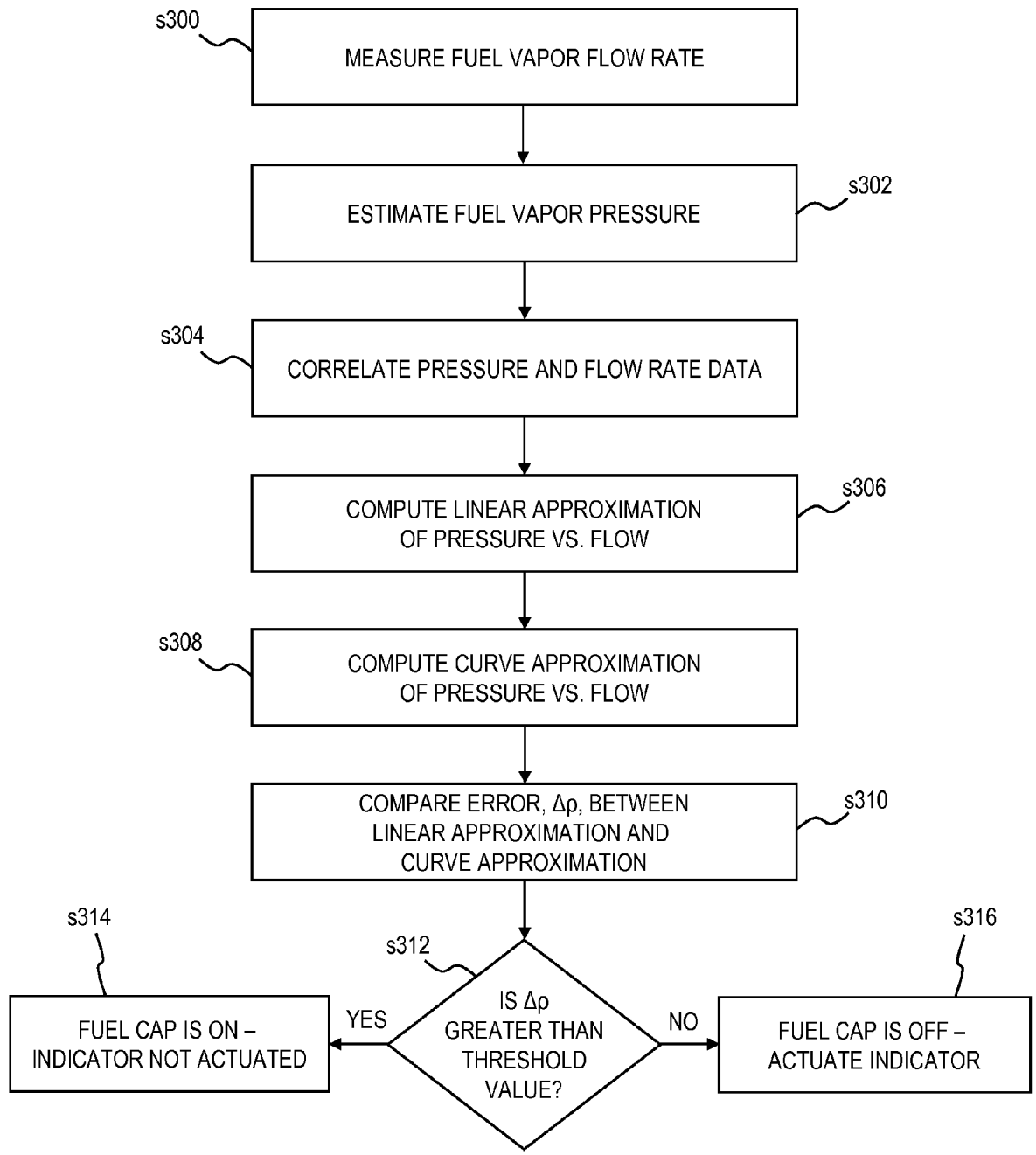
FIG. 6 is a flow diagram of a method for verifying fuel cap engagement according to yet another embodiment of the present invention.

With reference to FIGS. 1 and 6 in combination, a flow diagram detailing a method for verifying fuel cap engagement using a single transducer is shown in FIG. 6 according to yet another embodiment of the present invention. At step s300 fuel vapor flow transducer 46 is utilized to measure the fuel vapor flow rate in purge line 28 at one or more predetermined time intervals. The flow rate measurements are provided to monitor 48, which correlates the measurements with the time intervals. At step s302 the fuel vapor pressure in purge line 28 is estimated by monitor 48 using the fuel vapor flow rate measurements of step s300 and conventional fluid dynamics principles. Such methods for estimating fuel vapor pressure are well-known by those skilled in the art of fluid dynamics and thus will not be detailed further here. At step s304 monitor 48 correlates the estimates of step s302 with the vapor flow rate measurements and time intervals of step s300. Steps s306 through s316 correspond to previously-discussed steps s106 through s116 respectively and thus will not be reiterated here.

While this invention has been shown and described with respect to a detailed embodiment thereof, it will be understood by those skilled in the art that changes in form and detail thereof may be made without departing from the scope of the claims of the invention. For example, in some embodiments of the present invention transducers 44, 46 may be integrated into a unitary transducer that selectably or simultaneously provides both pressure and flow information to monitor 48.

What is claimed is:

1. A system for verifying fuel cap engagement, comprising:
   a transducer, coupled to a purge line of a fuel vapor recovery system to generate an electrical measurement signal corresponding to one of vapor pressure and vapor flow rate in the purge line;
   a monitor to: receive the electrical measurement signal; estimate, for a measured vapor flow rate, a corresponding vapor pressure in the purge line, the estimated vapor pressure value being equivalent to a measured vapor pressure value; estimate for a measured vapor pressure, a corresponding vapor flow rate in the purge line, the estimated vapor flow rate value being equivalent to a measured vapor flow rate value; correlate the electrical measurement signal and the estimated value to generate a dataset comprising data points relating vapor pressure to a corresponding vapor flow rate at predetermined time intervals; utilize the dataset to compute a linear approximation of pressure versus flow rate; and utilize the dataset to compute a curve approximation of pressure versus flow rate; and
   an indicator coupled to the monitor,
   wherein the monitor actuates the indicator when the difference between the computed linear and curve approximations is less than a predetermined threshold value.

2. The system of claim 1 wherein the electrical measurement signal corresponds to the vapor pressure in the purge line and the monitor estimates a vapor flow rate in the purge line corresponding to the vapor pressure.

3. The system of claim 1 wherein the electrical measurement signal corresponds to the vapor flow rate in the purge line and the monitor estimates a vapor pressure in the purge line corresponding to the vapor flow rate.

4. The system of claim 1 wherein the transducer generates at least one of an analog and digital electrical signal having at least one of variable resistance, capacitance, inductance, voltage, current and digital data corresponding to one of the vapor pressure and the vapor flow rate.

5. The system of claim 1 wherein the monitor comprises at least one of analog and digital electronic circuitry.

6. The system of claim 5 wherein the monitor further comprises at least one of a memory storage device and a predetermined set of instructions.

7. The system of claim 1 where in the indicator is at least one of a warning light, visual display, speaker, piezoelectric sounder and chime.

8. The system of claim 7 wherein the indicator is a standalone device.

9. The system of claim 7 wherein the indicator is a constituent element of a multi-function vehicle system.

10. The system of claim 1 wherein the monitor computes a linear approximation of vapor pressure versus vapor flow rate using linear regression to derive a straight-line equation.

11. The system of claim 1 wherein the monitor computes a curve approximation of vapor pressure versus vapor flow rate using curve fitting regression to derive an equation having at least one of polynomial, exponential and logarithmic terms.

12. The system of claim 1 wherein the threshold value for actuating the indicator is established at one of a predetermined vapor flow rate, a predetermined vapor pressure, a plurality of predetermined vapor flow rates, a plurality of vapor pressures, a predetermined range of vapor flow rates and a predetermined range of vapor pressures.

13. A system for verifying fuel cap engagement, comprising:
 a first transducer, coupled to a purge line of a fuel vapor recovery system to generate a first electrical signal corresponding to the vapor pressure in the purge line;
 a second transducer, coupled to the purge line to generate a second electrical signal corresponding to the vapor flow rate in the purge line;
 a monitor to: receive the first and second electrical signals; correlate the first and second electrical signals to generate a dataset comprising data points relating vapor pressure to a corresponding vapor flow rate at predetermined time intervals; utilize the dataset to compute a linear approximation of pressure versus flow rate; and utilize the dataset to compute a curve approximation of pressure versus flow rate; and
 an indicator coupled to the monitor,
 wherein the monitor actuates the indicator when the difference between the linear and curve approximations is less than a predetermined threshold value.

14. A method for verifying fuel cap engagement, comprising the steps of:
 measuring one of the pressure and the flow rate of fuel vapor in a purge line of a fuel vapor recovery system;
 estimating the flow rate of fuel vapor in the purge line when the vapor pressure is measured, the estimated flow rate value being equivalent to a measured flow rate value;
 estimating the pressure of fuel vapor in the purge line when the vapor flow rate is measured, the estimated pressure value being equivalent to a measured pressure value;
 correlating the pressure and flow rate measurements and estimated values at predetermined time intervals;
 computing a linear approximation of pressure versus flow rate in the purge line;
 computing a curve approximation of pressure versus flow rate in the purge line;
 computing the difference between the linear and curve approximations; and
 actuating an indicator if the computed difference is less than a predetermined threshold value.

15. The method of claim 14, fun her comprising the step of selecting a transducer to measure at least one of the fuel vapor pressure and the fuel vapor flow rate, the transducer generating at least one of an analog and digital electrical signal having at least one of variable resistance, capacitance, inductance, voltage, current and digital data corresponding to one of the vapor pressure and the vapor flow rate.

16. The method of claim 14, fun her comprising the step of selecting at least one of a warning light, visual display, speaker, piezoelectric sounder and chime for the indicator.

17. The method of claim 16, further comprising the step of configuring the indicator as a standalone device.

18. The method of claim 16, further comprising the step of configuring the indicator as a constituent element of a multi-function vehicle system.

19. The method of claim 14, further comprising the step of computing a linear approximation of vapor pressure versus vapor flow rate using linear regression to derive a straight-line equation.

20. The method of claim 14, further comprising the step of computing a curve approximation of vapor pressure versus vapor flow rate using curve fitting regression to derive a curve equation having at least one of polynomial, exponential and logarithmic terms.

21. The method of claim 14, further comprising the step of setting the threshold value for actuating the indicator at one of a predetermined vapor flow rate, a predetermined vapor pressure, a plurality of predetermined vapor flow rates, a plurality of vapor pressures, a predetermined range of vapor flow rates and a predetermined range of vapor pressures.

22. A method for verifying fuel cap engagement, comprising the steps of:
 measuring the pressure of fuel vapor in a purge line of a fuel vapor recovery system;
 measuring the flow rate of fuel vapor in the purge line;
 correlating the pressure and flow rate measurements at predetermined time intervals;
 computing a linear approximation of pressure versus flow rate in the purge line;
 computing a curve approximation of pressure versus flow rate in the purge line;
 computing the difference between the linear and curve approximations; and
 actuating an indicator if the computed difference is less than a predetermined threshold value.

* * * * *

UNITED STATES PATENT AND TRADEMARK OFFICE
CERTIFICATE OF CORRECTION

| | | |
|---|---|---|
| PATENT NO. | : 7,710,250 B2 | Page 1 of 1 |
| APPLICATION NO. | : 11/746050 | |
| DATED | : May 4, 2010 | |
| INVENTOR(S) | : Marcos J. Deleon | |

It is certified that error appears in the above-identified patent and that said Letters Patent is hereby corrected as shown below:

Column 5, line 2, "($\rho$, Q)t" should read --($\rho$, Q)$_t$--; line 27, "$\Delta\rho$herein" should read --$\Delta\rho$ herein--.

Column 8, line 11, "fun her" should read --further--.

Signed and Sealed this

Twenty-ninth Day of June, 2010

David J. Kappos
*Director of the United States Patent and Trademark Office*